United States Patent [19]

Burger

[11] 3,951,771

[45] Apr. 20, 1976

[54] SOLIDS REMOVAL FROM VISCOUS LIQUIDS

[75] Inventor: Edward D. Burger, Plano, Tex.

[73] Assignee: Atlantic Richfield Company, Los Angeles, Calif.

[22] Filed: July 21, 1975

[21] Appl. No.: 597,483

[52] U.S. Cl. ............................ 204/190; 204/185
[51] Int. Cl.² ...................................... B01D 17/06
[58] Field of Search ....................................
204/186–191, 184, 185, 149

[56] References Cited
UNITED STATES PATENTS

| | | | |
|---|---|---|---|
| 2,039,636 | 5/1936 | Dillon et al. | 204/184 |
| 2,151,318 | 3/1939 | Dillon et al. | 204/184 |
| 2,337,291 | 12/1943 | Adams et al. | 204/188 |
| 3,196,095 | 7/1965 | Wadsworth | 204/149 |

*Primary Examiner*—T. M. Tufariello
*Attorney, Agent, or Firm*—James C. Fails

[57] ABSTRACT

What is disclosed is a method for treating a hydrophobic viscous feed, such as a syncrude fraction containing solids, to remove at least a portion of the solids having a minimum syncrude fraction therewith, characterized by a multi-step process. First, water is mixed with the feed to provide two liquid phases in the mixture. The mixture is then subjected to at least one electric field in at least one electrostatic zone to produce a first overflow containing product, such as the syncrude fraction, that is reduced in solids content as compared to the original feed, and an overflow containing water, solids and residual feed. Next, the first underflow is centrifuged to produce a second overflow containing residual feed and water and a second underflow containing primarily solids, with a minor amount of liquids. At least a part of the second overflow is returned to electrostatic zone for recovery of at least part of the residual feed. Also disclosed are improvements in the basic process; including those in which, singly or in combination, a diluent is added; a plurality of electrostatic zones and centrifuging zones are employed; a flashing step is employed; and specific apparatus for carrying out the steps.

16 Claims, 2 Drawing Figures

SOLIDS REMOVAL FROM VISCOUS LIQUIDS

BACKGROUND OF THE INVENTION

1. Field of the Invention

This invention relates to a method of removing solids from a viscous hydrophobic feed stream containing solids. More particularly, it relates to a method for removing solid particles from a viscous synthetic hydrocarbonaceous liquid, such as at least a fraction of an original syncrude.

2. Description of the Prior Art

The problem of separating solids from a feed stream is an old one; and the art is replete with a variety of apparatus and methods for accomplishing the separation. For example, solid bowl centrifuges, perforate bowl centrifuges and the like have been employed to separate solids from drilling muds, either water based muds or oil based muds. Moreover, other industries have encountered this problem and have resolved it by a variety of different methods and apparatus. One broad industrial process that has had a severe problem of separating the solids from the feed stream is that of producing a synthetic hydrocarbon, usually called syncrude, or the more viscous fractions thereof. For example, syncrudes have been produced from coal, tar sands, oil shale and the like. Generally, these syncrudes have had intolerably high amounts of solids, such as the sand, oil shale, coal ash, carbon particles, and the like in the syncrude. Accordingly, when the syncurde was syncrude into its various fractions by appropriate techniques, at least one of the more viscous fractions would contain these solids. Discard of these fractions having the intolerably high portion of solids therein created a pollution problem and, also, resulted in a loss that adversely affected an already marginally feasible process. Even the increased recent emphasis on additional sources of energy have not alleviated this problem. Instead, it has made more desirable the provision of a method of recovering the desirable portions of the syncrude fraction while minimizing the losses in the solids phase for economical and ecological reasons.

Specifically for shale oil, processed shale must be removed from crude shale oil in order to produce either a low ash coke or a low ash fuel oil. In a typical shale oil recovery process, the processed shale (solids) is concentrated in a heavy fraction of the shale oil. No satisfactory method for removing these solids from this shale oil has been provided heretofore, since conventional filtration and/or centrifugation processes alone are inadequate.

Discarding the solids-containing fraction without removing the solids is not only wasteful by wasting the shale oil fraction content, but is unsafe and is a pollution factor that must be reckoned with in dealing with the regulatory agencies of the government.

Typical of the wide variety of patents for producing syncrudes and finally ending up with a fraction that had an undesirably high proportion of syncrude fraction in the waste product are the following patents: U.S. Pat. Nos. 2,420,376; 3,025,223; 3,350,200; and 3,841,993. In all of these processes, the waste products could have employed to advantage the method of this invention.

Thus, insofar as I am aware, the prior art has not provided a satisfactory method of separating the solids from the viscous streams of liquid, such as the viscous synthetic hydrocarbon fractions.

SUMMARY OF THE INVENTION

Accordingly, it is an object of this invention to provide a method for treating a viscous feed, such as a synthetic hydrocarbonaceous liquid that contains solid particles, to remove at least a portion of the solid particles with minimum feed loss and alleviate the problems of the prior art.

It is a particular object of this invention to provide a method that can be employed in conjunction with conventional methods and effect treatment of waste streams for recovering of additional viscous liquid with tolerably low content of solid particles; and, thereby, render feasible processes that were at best only marginally feasible before this invention.

These and other objects will become apparent from the following descriptive matter, particularly when taken in conjunction with the drawings.

In accordance with this invention, there is provided a method for treating a viscous liquid feed, such as a synthetic hydrocarbonaceous liquid that contains solid particles, to remove at least a portion of the solid particles with minimum liquid feed loss and characterized by a multi-step process as follows. First, water is mixed with the feed to provide a second liquid phase in the feed. The mixture of the water and the feed is thereafter subjected to at least one electric field in at least one electrostatic zone. Consequently, there is produced a first underflow containing water, solids and residual feed that is separated from a mixture, leaving in a first overflow a feed-rich product which is reduced in solids content as compared to the original feed. Next, the first underflow is centrifuged in at least one centrifuging zone to produce a second overflow containing residual feed and water, and a second underflow containing primarily solids, with a minimum amount of liquid. At least a part of the second overflow is returned to the electrostatic zone for recovery of at least a part of the residual feed.

In another embodiment of this invention, a diluent is added to at least a portion of the first underflow from the first electrostatic zone and a portion of the diluent is recovered by being returned in the second overflow.

In still another embodiment, at least a portion of the underflow from the electrostatic zone is fed to a flash tower at reduced pressure; the overhead from the flash tower is fed to a separator; and the bottoms from the separator is recycled to combine with the bottoms from the flash tower before being fed to the first centrifuge zone.

In a still more detailed embodiment, a plurality of respective electrostatic zones and centrifuge zones are employed for still more nearly optimum results. The plurality of respective electrostatic zones and centrifuge zones may be employed in conjunction with one or more of the other embodiments delineated hereinbefore.

The injection of the water induces a hydrophilic phase into the feed. Theoretically, the solids tend to become associated with; for example, migrate into; that disperse, hydrophilic phase so as to facilitate removal by an electric field.

The electric field causes the droplets of the aqueous phase, as the disperse phase, to elongate and to become essentially a charged particle with all of the positively charged ends of the droplets oriented toward the negative electrode and all of the negatively charged ends of the droplets oriented toward the oppositely disposed negative electrode. Such an orientation places the positive and negative ends of adjacent droplets next to each other. Accordingly, the droplets will be attracted toward each other to assist in the coalescence, or the joinder of the smaller droplets to form larger drops. The larger drops then tend to settle out under the force of gravity, carrying with them the solids that have been caused to become preferentially associated with the aqueous phase by the addition of the water. The solids carry with them any liquid feed that has wet their surfaces and a minor amount by entrainment.

The centrifugation, following the electrical field, further assists the separation of the more dense solids and aqueous phase from the less dense hydrophobic syncrude fraction in the underflow from the electrical field.

The combined action is significantly more effective than either of the effects alone in reducing the solids content of the syncrude fraction.

The diluent washes the difficultly removable syncrude fraction from the solids and replaces with the more easily removable and recoverable diluent. This enhances both the recovery of the syncrude fraction and alleviates problems with pollution by the disposed solids.

DESCRIPTION OF PREFERRED EMBODIMENTS

Figure 1:
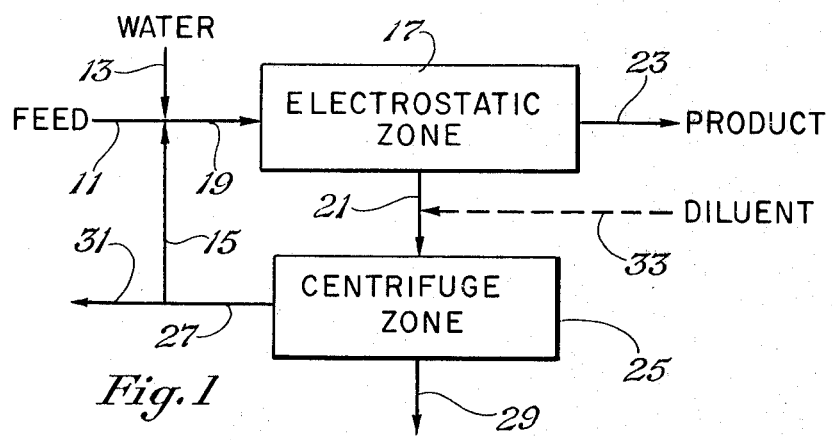
FIG. 1 is a flow diagram of a simplified embodiment of this invention.

In the method of this invention, the feed may comprise any viscous hydrophobic liquid that contains solids that cannot be separated readily by conventional processes. In the most urgent commercial processes employing this invention, the viscous hydrophobic liquid portion of the feed will comprise a synthetic crude oil or fraction thereof. As indicated hereinbefore, synthetic crude oils are referred to generically as "syncrude" and comprise, ordinarily, liquid; such as, shale oil, bitumen, "liquefied coal" and the like that are produced, respectively, from oil shale, tar sands, and coal. The fraction of the syncrude that makes up the hydrophobic liquid will usually be a viscous fraction, such as the bottoms from a fractionator. Consequently, herein, the liquid portion of the feed stream may be referred to as a syncrude fraction, although it is to be remembered that such reference is only by way of example in order to give the reader a feel for a specific process.

The feed may also include a hydrocarbonaceous diluent, or constituent, such as is added to obtain desired density and viscosity. Typically, the hydrocarbonaceous constituent may comprise naphtha or adjacent hydrocarbon fractions that are added to the feed stream to obtain a specified API (American Petroleum Institute) gravity and to lower the viscosity to a predetermined value. Enough constituent must be added to provide a liquid feed that is less dense than water. Preferably, sufficient hydrocarbonaceous constituent is added to obtain an API gravity within the range of 15°–40°; still more preferably around 20°. This is ordinarily sufficient to obtain a desired viscosity for operability.

The solids may be any of the solids that cannot be removed by conventional processes, as indicated hereinbefore. The solids include a gradation of particle sizes down to and including those small enough to form stable suspensoids. The particles may comprise, for example, processed shale, processed sand, processed coal, or the like depending upon the nature of the syncrude fraction.

The water that is employed in the invention may comprise any of the conventionally available waters, including well water, river water, lake water, or run-off water from snow, glaciers and the like. The water can even include brines, although they are ordinarily employed as a last resort because of the tendency to salt the syncrude fraction. There is no requirement for employing distilled, or pure water, although the latter can be employed advantageously, if available.

The electric field and the electrostatic zone may comprise any of the commercially available units employing operable electrical fields through which the mixture of the feed and water can pass. The electrostatic zone ordinarily comprises an enclosed, pressurized vessel that will withstand the operating pressure of the process. The principle on which it operates may be one or both of the mechanisms theorized to be dominant in this technology. Mr. Logan C. Waterman, in his article "Electrical Coalescers", CHEMICAL ENGINEERING PROGRESS, Volume 61, No. 10, October 1965, pages 51–57, has an excellent discussion of the theory and the units that are commercially available from his company, Petrolite Corporation, Houston, Texas. The electrostatic zone may comprise units that operate on the principle of movement responsive to a dipole attraction between particles or droplets of a disperse phase, or unidirectional applied fields. The units may include desalters, electrofining precipitators, electro filters, or the electrostatic demineralizers. The electro filters and electrostatic demineralizers are particularly effective.

In any event, the electrostatic zone produces a first underflow containing water, solids and residual feed that is separated from the mixture as indicated. This leaves a liquid feed-rich product in the first overflow, the product having a tolerably low level of solids content that is much reduced as compared to the original feed.

The centrifuge zone in which the centrifuging is done may comprise any of the operable centrifuges to effect the separation of the underflow from the electrostatic zone into a second overflow containing residual feed and water and a second underflow containing primarily the solids and water. While perforated rotating cylinder type centrifuges, and disc-nozzle centrifuges could theoretically be employed, the solid bowl centrifuges are deemed preferable. These centrifuges are commercially available and this application need not describe the centrifuges in detail. It is sufficient to note that the centrifugal force will be adequate to effect the separation as delineated hereinafter.

The amount of water that is injected into the feed stream may vary widely. For example, an amount in the range of from 5 to 30 percent can be employed. The process has been operated with an amount of water between 9 and 26 percent. A satisfactory volumetric percent is about 12 percent by volume of water in the combined stream of feed and water.

Referring to FIG. 1, the feed enters through line 11. The water is added through line 13. Water and residual feed will also be added via line 15. The water is intimately intermixed with the feed in order to increase the tendency to water wet the solids and to cause the solids to tend to migrate into the disperse, or aqueous, phase; so as to facilitate coalescing of the disperse phase and removal of the solids in the electrostatic zone 17. For example, the admixture is flowed through a mixing valve in which the turbulence achieves this intimate intermixing. In any event, the combined feed stream of feed and water is flowed through line 19 into the electrostatic zone 17. As the feed stream flows through the electrostatic zone 17, the mixture tends to separate into a first underflow flowing out line 21 and a first overflow flowing out line 23. The first overflow is a feed-rich product that is much reduced in solids content, as compared to the original feed. Preferably, the product out line 23 has a tolerably low level of solids. The first underflow contains water, solids and residual feed.

The first underflow is thereafter fed to a centrifuge zone 25. In the centrifuge zone, a sufficient centrifugal field is developed to produce a second overflow flowing out line 27, that contains residual feed and water; with a second underflow containing primarily solids with a minimum amount of liquids flowing out line 29.

At least a portion of the second overflow flowing out line 27 is returned through line 15 to the entering feed, as indicated hereinbefore. Consequently, at least a part of the residual feed from the centrifuge zone is recovered. If desired, a portion of a second overflow may be withdrawn through line 31.

In the illustrated embodiment, the vessel serving as a centrifuge in the centrifuge zone 25, comprises a pressurized vessel for operating in the pressure range of from 25 to 150 pounds per square inch gauge (psig); for example, about 100 psig. Preferably, the temperature of this stream is elevated to a temperature in the range of about 150°–300°F; for example, about 250°F. Desirably, the vessel through which the mixture flows and defining the electrostatic zone 17 will be operated at substantially the same or slightly higher pressure. Appropriate pressure controls and flow control devices and apparatus will be employed to automate the process, rather than require personal attention of the operators or engineers.

In one embodiment of this invention, the separation into the second overflow and second underflow is made easier by the addition of a diluent downstream of the electrostatic zone 17, illustrated by the dashed line 33.

The diluent is preferably a hydrophobic liquid that has a lower viscosity than the syncrude fraction portion of the feed. Moreover, the diluent should have a relatively lower boiling point than the syncrude fraction in order to facilitate the removal from the solids portion of an underflow effluent. The diluent may comprise any of the satisfactory petroleum hydrocarbons; for example, paraffin hydrocarbon having from 5 to 16 carbon atoms, inclusive; in either a relatively pure state or in an admixture. Ordinarily, economy will dictate that a mixture of the hydrocarbons, such as a particular fraction from a fractionator, be employed. Typically, a naphtha fraction is a very nearly ideal fraction for this purpose. Other fractions include kerosene. In the unlikely event that a relatively pure hydrocarbonaceous diluent is employed, care should be taken to prevent deasphalting of heavy liquid feeds if the diluent contains less than about 8 carbon atoms.

The diluent is added in an amount that is sufficient to enable recovery of the hydrocarbonaceous material from the solids. The more of the diluent that is added the better will be the recovery of the hydrocarbonaceous fluid. The amount that is added is, however, an economic trade-off, since the more of the diluent that is added the greater fractionation and perhaps the greater centrifugation capacity that will be needed. I have found that an amount of the diluent sufficient to give a diluent/liquid stream ratio in the range of 1:10 or higher is operable. Further improved results appear to be had when the diluent/liquid ratio is in the range of 2.5–7.5; for example, about 5.0.

Those skilled in the chemical engineering art will appreciate that the process of FIG. 1 will be useful in limited situations but would lack flexiblity for a wide variety of feed streams. Moreover, pressurized centrifuges for effecting the centrifuge zone 25 are ordinarily very expensive and difficult to operate efficiently. It would be desirable to reduce the pressure on the underflow from the electrostatic zone and carry out the centrifuging operation in an atmospheric centrifuge zone.

Moreover, it is desirable that any degree of severity of operating conditions can be employed to effect a desired product specification. A process for effecting such flexibility, with or without atmospheric centrifugation, is illustrated diagrammatically in FIG. 2.

Figure 2:
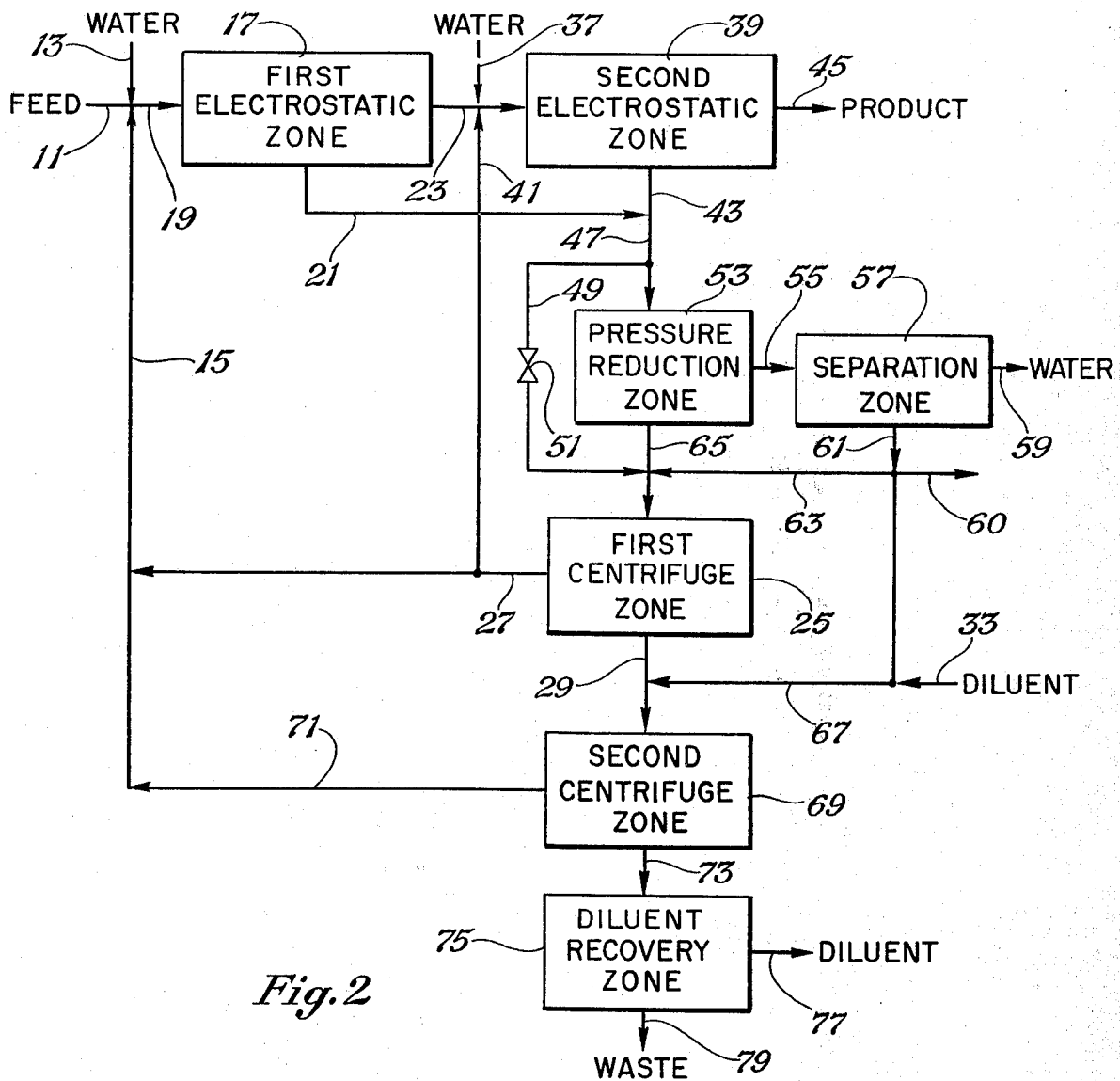
FIG. 2 is a flow diagram of a more flexible process that is readily amenable to commercial application on a wide variety of different types of viscous feeds containing solids.

Referring to FIG. 2, the feed enters line 11. Water is added through line 13. Water, residual feed, and diluent where applicable, is also added through line 15. The combined, intimately admixed stream flows via line 19 into the first electrostatic zone 17; all similarly as described with respect to FIG. 1. As the mixture flows through the first electrostatic zone 17, there is formed a first underflow containing water, solids and residual feed, leaving as the overflow, a feed-rich product that is reduced in solids content as compared to the original feed. The first underflow flows out line 21, while the first overflow flows out line 23. In FIG. 2, an additional line, shown by dashed lines 37, may be employed to add make-up water to the first overflow, if desired. Ordinarily, no additional water make up is needed for the second electrostatic zone 39, since a recycled mixture, including water, is acceptable for the second electrostatic zone and is added via line 41, as will be described in more detail hereinafter.

In any event, the first overflow out line 23 with water added via line 41, is intimately admixed and sent to the second electrostatic zone 39. The second electrostatic zone 39 produces a further separation into a final overflow product flowing out line 45, and into another first underflow flowing out line 43. The first underflow flowing out line 43 contains water, solids and residual feed, similarly as did the first underflow flowing out line 21.

Consequently, the streams in lines 21 and 43 are combined and flowed through line 47.

If, as described with respect to FIG. 1 hereinbefore, a pressurized centrifuge is being operated, the combined stream may be flowed through line 49 and valve 51 to the pressurized centrifuge.

Ordinarily, however, the combined stream will be flowed via line 47 to a pressure reduction zone 53. The illustrated pressure reduction zone 53 is defined by a flash tower that allows the combined stream to flash to ambient pressure. For example, if the entering stream is at about 250°F and 100 psig, it may be flashed to an atmospheric pressure and corresponding temperature; for example, about 11.7 psi absolute in a high-altitude Colorado plant and about 200°F.

Flashing of the admixed first overflow stream will result in an overhead fraction flowing out line 55 to a separator zone 57. The overhead fraction may be, for example, low boiling hydrocarbon vapor, including diluent vapor, and water vapor, or steam. The separator zone 57 ordinarily will comprise a conventional water-oil separator that separates the water leaving via line 59 from the low boiling hydrocarbons or diluent leaving via line 61. As indicated hereinbefore, liquid level controls may be employed to control the flow of the respective products therefrom and control the interface between the hydrocarbonaceous and aqueous phases in the separator zone 57. The low boiling hydrocarbon or diluent is passed through line 63 to be recombined with the bottoms leaving the pressure reduction zone 53 via line 65. If desired, the diluent can be withdrawn without being recycled; for example, through line 60 or 59.

The combined stream of the bottoms from line 65 and the hydrocarbons or diluent in line 63 is then passed to the first centrifuge zone 25. In the first centrifuge zone 25, a centrifugal field is developed to produce a second overflow containing residual feed and water that passes out line 27; and a second underflow containing primarily liquid feed-coated solids and water that passes out line 29. As described briefly hereinbefore, a portion of the second overflow is added to line 23 via line 41. A second portion is added via line 15 to the feed in line 11.

A diluent is added via line 67 to the second underflow in line 29 and the combined stream is passed to a second centrifuge zone 69. The amount of diluent that is added in lines 63 and 67 may require a supplemental addition of diluent via line 33. The diluent added downstream of the first centrifuge zone dilutes the syncrude fraction/oil associated with the solids in the underflow from the first centrifuge zone 25. Upon centrifuging this new mixture in the second centrifuge zone, the majority of the syncrude fraction leaves in the overflow stream in line 71 and the oil associated with the solids in the underflow is mainly diluent, such as naphtha. This naphtha can be easily recovered by heating the sludge.

In any event, the combined stream is subjected to the centrifugal field in the second centrifuge zone 69 and produces a second overflow containing residual feed, diluent and water in line 71. The second overflow in line 71 will be passed, via line 15, to be admixed with the feed in line 11. The remainder, or the second underflow passes out line 73 and contains primarily solids with a small amount of diluent and liquid feed coating the solids, and a small amount of water.

In the event that diluent has been added, it is readily recovered in a diluent recovery zone 75; for example, by heating the combined material to drive off the diluent in vapor form. The diluent then passes out line 77 to be condensed and recovered, as for recycling. The waste passes out line 79. The waste may be discarded safely, since it will have a safely low proportion of synthetic crude fraction and diluent thereon.

There are different conditions of operability. These conditions include the following:

1. No flashing of the liquid stream upstream of the first centrifuge zone 25 and employing a pressurized centrifuge. This is theoretically an efficient way to operate, but is expensive from the standpoint of the cost and the difficulty of efficiently operating the pressurizing centrifuge.

2. Flashing the liquid stream to atmospheric pressure upstream of the first centrifuge zone 25.

3. Flashing the liquid stream to atmospheric pressure upstream of the first centrifuge zone 25, but condensing and blending back the naptha, or diluent.

The following examples are given to afford specific information on the individual steps in the process, as well as the overall results. These examples are the results of computerized study of laboratory and semi-works data.

EXAMPLE I

In this example, the feed comprised 100.0 pounds of a syncrude fraction that was a fraction of shale oil boiling above about 925°F; 33.1 pounds of naphtha that had been added to reduce the API gravity and viscosity of the feed; and 3.00 pounds of processed shale comprising the solid phase. An amount of 2.29 pounds of water was added via line 13. Also added through line 15 was 4.92 pounds of the syncrude fraction, 1.52 pounds of naphtha, 18.9 pounds of water and 0.0322 pound of solids from the second overflow from the first centrifuge zone 25 in line 27; and 0.925 pound of syncrude fraction, 6.33 pounds of naphtha, and 0.0363 pound of solids in the second overflow stream in line 71 from a second centrifuge zone 69.

After treatment in the first electrostatic zone, the first underflow in line 21 contained 11.2 pounds of syncrude fraction, 4.34 pounds of naphtha, 21.2 pounds of water and 2.95 pounds of solids. The first overflow stream in line 23 had 94.6 pounds of syncrude fraction, 36.7 pounds of naphtha, no water and only 0.122 pounds of solids. Admixing with this first overflow stream via line 41 was 5.22 pounds of syncrude fraction, 1.61 pounds of naphtha, 20.0 pounds of water, and 0.0342 pound of solids. The product in line 45 included 99.9 pounds of syncrude fraction, 38.3 pounds of naphtha and 0.0406 pound of solids, an acceptably low level. The first underflow in line 43 included 20.0 pounds of water and 0.115 pound of solids.

The combined feed stream in line 47 was then flashed in the pressure reduction zone 53. The overhead going out line 55 contained 0.883 pound of naphtha, 2.06 pounds of water. None of the naphtha was recycled back through line 63. The bottoms from the pressure reduction zone 53 in line 65 included 11.2 pounds of syncrude fraction, 3.45 pounds of naphtha, 39.1 pounds of water and 3.06 pounds of solids. When subjected to centrifugation in the first centrifuge zone 25, the overflow in line 27 included 10.1 pounds of syncrude fraction, 3.13 pounds of naphtha, 38.9 pounds of water and 0.0664 pound of solids. The underflow from the first centrifuge zone 25 in line 29 included 1.06 pounds of syncrude fraction, 0.326 pound of naphtha, 0.230 pound of water and 3.00 pounds of solids. Thus, it can be seen that the underflow was relatively dry material. Accordingly, diluent was added via line 67. The diluent included 6.91 pounds of naphtha. When the admixture of the two streams was subjected to centrifugation in the second centrifuge zone 69, the overflow in line 71 comprised the previously delineated 0.925 pound of syncrude fraction, 6.33 pounds of naphtha and 0.0363 pound of solids; whereas the underflow in line 73 comprised 0.132 pound of syncrude fraction, 0.906 pound of naphtha, 0.230 pound of water and 2.96 pounds of solids.

In summary, the solids were reduced from 3.00 pounds of solids per 100 pounds of syncrude fraction to only 0.0407 pound solids per 100 pounds of syncrude fraction. Moreover, there is only 0.132 pound of syncrude fraction in the final sludge per 100 pounds of syncrude fraction feed.

EXAMPLE II

Similarly as with Example I, the feed had 3.00 pounds of solids per 100 pounds of the syncrude fraction. The feed in line 11 contained 100 pounds of the syncrude fraction delineated hereinbefore in Example I, 32.7 pounds of naphtha and 3.00 pounds of solids, the solids being the same as delineated in Example I, also. 2.29 pounds of water were added in line 13. Also added to the feed via line 15 were 4.94 pounds of syncrude fraction, 1.92 pounds of naphtha, 18.9 pounds of water and 0.0343 pound of solids from a portion of the overflow in line 27 from the first centrifuge zone 25; and 0.872 pound of syncrude fraction, 6.39 pounds of naphtha and 0.0363 pound of solids from the second overflow in line 71. After the mixture was subjected to the electrical field in the first electrostatic zone 17, the first underflow in line 21 included 11.2 pounds of syncrude fraction, 4.34 pounds of naphtha, 21.2 pounds of water and 2.95 pounds of solids. The first overflow in line 23 included 94.6 pounds of syncrude fraction, 36.6 pounds of naphtha and 0.121 pound of solids. To the first overflow fraction in line 23 was added, via line 41, 5.27 pounds of syncrude fraction, 2.04 pounds of naphtha, 20.1 pounds of water and 0.0365 pound of solids. After the resulting mixture was treated by the electric field in the second electrostatic zone 39, the overflow, or product, in line 45 included 99.9 pounds of syncrude fraction, 38.7 pounds of naphtha and 0.0398 pound of solids. The underflow from the second electrostatic zone 39, coming out line 43, contained 20.1 pounds of water and 0.118 pound of solids. The admixture resulting by combining the streams in lines 21 and 43 was then passed to the pressure reduction zone 53 where it was flashed. The overhead in line 55 included 2.06 pounds of water, all of the naphtha being recirculated by line 63. Consequently, the recirculated naphtha and the bottoms in line 65 were combined to include 11.2 pounds of syncrude fraction, 4.34 pounds of naphtha, 39.2 pounds of water and 3.07 pounds of solids.

After the admixture was subjected to centrifugation in the first centrifuge zone 25, the overflow in line 27 included 10.2 pounds of syncrude fraction, 3.96 pounds of naphtha, 38.9 pounds of water and 0.0708 pound of solids. As implied hereinbefore, this was divided between lines 15 and 41 to be recycled. The underflow from the first centrifuge zone 25 in line 29 included 0.997 pound of syncrude fraction, 0.386 pound of naphtha, 0.230 pound of water and 3.00 pounds of solids. An amount of 6.92 pounds of naphtha was added via lines 33 and 67 to be admixed with the relatively dry underflow in the first centrifuge zone 25. When subjected to a second centrifugation in the second centrifuge zone 69, the second overflow in line 71 was produced, as indicated hereinbefore. This left the underflow in line 73 containing 0.125 pound of syncrude fraction, 0.914 pound of naphtha, 0.230 pound of water and 2.96 pounds of solids. The naphtha was readily recovered by heating in a diluent recovery zone 75.

Thus, it can be seen that the solids was reduced from 3.00 pounds of solids per 100 pounds of syncrude fraction feed to 0.0398 pound of solids per 100 pounds of syncrude fraction in the product. Moreover, only 0.125 pound of syncrude fraction was lost in the final sludge per 100 pounds of syncrude fraction in the feed.

From the foregoing, it can be seen that this invention provides a method of removing solids from a viscous liquid, such as a syncrude fraction, and thereby accomplishes a twofold purpose. Firstly, the valuable viscous liquid is recovered to supplement the ever shrinking supply of sources of energy; and secondly, the solids are rendered nonpolluting so they are safe to be disposed of as waste product. Thus, it can be seen that this invention accomplishes the objects delineated hereinbefore and alleviates the disadvantages of the prior art.

Having thus described this invention, it will be understood that such description has been given by way of illustration and example and not by way of limitation, reference for the latter purpose being had to the appended claims.

What is claimed is:

1. A method for treating a synthetic hydrocarbonaceous liquid feed which contains solid particles to remove at least a portion of said solid particles with minimum feed loss, comprising:
   a. mixing water with said feed to provide a second liquid phase in said feed;
   b. subjecting said mixture of feed and water to at least one electric field in at least one electrostatic zone whereby a first underflow containing water, solids and residual feed is separated from said mixture, thereby leaving a feed-rich product in the first overflow which is reduced in solids content as compared to the original feed;
   c. centrifuging said first underflow in at least one centrifuging zone to produce a second overflow containing residual feed and water, and a second underflow containing primarily solids with a minimum amount of liquids; and
   d. returning at least a part of said second overflow to said electrostatic zone for recovery of at least part of said residual feed.

2. The method of claim 1 wherein at least a portion of said underflow is fed to a flash tower at reduced pressure; the overhead from said flash tower is fed to a separator; and the bottoms of said separator is recycled to combine with the bottoms from said flash tower.

3. The method of claim 2 wherein a hydrophobic diluent is added to the combined bottoms from said flash tower and said separator upstream of a centrifugation zone where the resulting admixture is subjected to a centrifugal field.

4. The method of claim 1 wherein a hydrophobic diluent is added to at least a portion of said first underflow from said electrostatic zone.

5. The method of claim 1 wherein there are at least two separate elevated pressure electrostatic zones, each subsequent electrostatic zone using as its feed the overflow of the next preceeding electrostatic zone.

6. The method of claim 5 wherein the underflow of said electrostatic zones passes to a pressure reduction zone at reduced pressure and water and some of any diluent employed is removed from the underflow.

7. The method of claim 6 wherein said diluent flashed from said underflow in said pressure reduction zone is recombined with the bottoms therefrom downstream thereof.

8. The method of claim 5 wherein there are at least two separate centrifuge zones, the first of said zones using as its feed the bottoms from said pressure reduction zone, each subsequent centrifuge zone using as its feed the underflow of the next preceeding centrifuge zone.

9. The method of claim 8 wherein the overflow from said centrifuge zones is employed as part of the mixture entering at least one of said electrostatic zones.

10. The method of claim 8 wherein a diluent is mixed with a feed stream to each centrifuge zone.

11. The method of claim 10 wherein said diluent is hydrophobic.

12. The method of claim 11 wherein said hydrophobic diluent comprises a hydrocarbonaceous fluid containing in respective molecules 5 to 16 carbon atoms, inclusive.

13. The method of claim 12 wherein said hydrocarbonaceous fluid is in relatively pure form and contains 8–16 carbon atoms, inclusive.

14. The method of claim 12 wherein said diluent and solids are heated to drive off the diluent in vapor form for recovery.

15. The method of claim 11 wherein said hydrophobic diluent comprises naphtha.

16. The method of claim 1 wherein the feed includes a hydrocarbonaceous constituent to obtain a predetermined density and viscosity.

* * * * *